(12) United States Patent
Thimmesch et al.

(10) Patent No.: US 8,277,663 B2
(45) Date of Patent: *Oct. 2, 2012

(54) BLENDED SALT COMPOSITION AND METHOD OF USING

(75) Inventors: Kevin Thimmesch, Overland Park, KS (US); Jerry Poe, Hutchinson, KS (US)

(73) Assignee: North American Salt Company, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/609,226

(22) Filed: Oct. 30, 2009

(65) Prior Publication Data

US 2010/0140178 A1    Jun. 10, 2010

Related U.S. Application Data

(60) Provisional application No. 61/110,112, filed on Oct. 31, 2008.

(51) Int. Cl.
   *C02F 3/00* (2006.01)
(52) U.S. Cl. .... 210/670; 210/674; 252/181; 252/182.12
(58) Field of Classification Search .................. 210/670, 210/674; 252/181, 182.12
   See application file for complete search history.

(56) References Cited

U.S. PATENT DOCUMENTS

| | | | |
|---|---|---|---|
| 2,749,306 A * | 6/1956 | Coleman | 210/673 |
| 3,514,296 A | 5/1970 | Frank et al. | |
| 3,977,968 A | 8/1976 | Odland | |
| 4,207,397 A | 6/1980 | Davis et al. | |
| 5,232,953 A | 8/1993 | Johnson | |
| 5,254,257 A | 10/1993 | Brigano et al. | |
| 7,758,770 B2 * | 7/2010 | Poe | 252/181 |
| 2006/0030506 A1 * | 2/2006 | Song et al. | 510/382 |
| 2006/0096920 A1 | 5/2006 | Ayala et al. | |
| 2006/0231495 A1 * | 10/2006 | Freydina et al. | 210/670 |
| 2009/0127502 A1 | 5/2009 | Poe | |

FOREIGN PATENT DOCUMENTS

| | | | |
|---|---|---|---|
| JP | 59066858 A | * | 4/1984 |
| KR | 2005023587 A | * | 3/2005 |
| KR | 10-0521396 | | 10/2005 |

OTHER PUBLICATIONS

Derwent Accession No. 2005-549821, published 2006 (Abstract of KR 2005023587 A).*
Abstract of JP 59-66858, 1984.*
Written Opinion and Search Report dated May 24, 2010, in corresponding PCT/US2009/062739, international filed Oct. 30, 2009.
Certification of translation of Korean Patent No. 10-0521396 registered on Oct. 6, 2005 (Korean Patent Application No. 10-2003-0059929 filed on Aug. 28, 2003).

* cited by examiner

*Primary Examiner* — Chester Barry
(74) *Attorney, Agent, or Firm* — Hovey Williams LLP (57) ABSTRACT

Novel water softening compositions and methods of treating hard water are provided. The compositions comprise a blend of sodium chloride and potassium chloride. The compositions are useful for regenerating ion exchange material in a water softening system and providing softened water containing both sodium and potassium ions.

14 Claims, 6 Drawing Sheets

BLENDED SALT COMPOSITION AND METHOD OF USING

CROSS-REFERENCE TO RELATED APPLICATIONS

The present application claims the priority benefit of U.S. Application Ser. No. 61/110,112, filed Oct. 31, 2008, incorporated by reference in its entirety herein.

BACKGROUND OF THE INVENTION

1. Field of the Invention

The present invention relates to an improved composition for use in water conditioning systems.

2. Description of Related Art

Hard water is a common problem and is caused by the presence of high levels of precipitates such as calcium and magnesium. The ion of these metals can cause numerous issues, including lessening the effectiveness of detergents and causing scale build-up in water lines. Water softeners (or water conditioners, used interchangeably herein) have commonly been used to treat hard water. In general, a water softener is a mechanical appliance that includes a resin tank filled with a bed of beads made of an ion exchange medium (e.g., resin) and a brine tank that holds a salt solution. Conventional water softeners use a single salt (e.g., sodium chloride or potassium chloride) and rely on an ion exchange process, whereby the calcium and magnesium hardness ions in the water are replaced with the metal ions of the salt.

To soften the water, the ion exchange material is first charged with a brine solution. The term brine as used herein refers to a saturated or substantially saturated aqueous solution (i.e., at least 100,000 ppm of a salt). Then, as hard water passes through the resin bed, positively charged calcium and magnesium ions in the water are attracted to the ion exchange resin, replacing the metal ions of the salt previously attached to the active sites on the resin beads. As the number of active sites on the resin beads decreases (i.e., as more and more calcium and magnesium ions are attracted) the effectiveness of the resin bed is lessened.

At some point, the resin bed needs to be "regenerated" or "recharged" to release the calcium and magnesium minerals from the ion exchange material and replace them with other ions. Such water softeners typically use a sodium chloride brine to recharge the resin bed. Dry sodium chloride is added to the brine tank. The bottom portion of the tank contains a brine solution, but the sodium chloride will fill the tank above the level of the solution. The brine solution is passed through the resin beads and sodium ions are added to the active sites of the resin beads, to be displaced by calcium or magnesium ions during the water softening process. One problem with this system is that water tends to "wick up" the product and leads to mushing of some sodium chloride products. Mushing results when the salts softens and dissolves into granules or particles due to exposure to the aqueous environment of a water softener.

Potassium chloride can also be used in the brine tank instead of sodium chloride, with the resulting use of potassium ions at the active sites on the resin beads. One advantage of using potassium chloride is that sodium ions are avoided, which is preferable for people on a sodium-restricted diet. However, one drawback to using potassium chloride in the brine tank is the increased cost over sodium chloride. In addition, there is usually recrystallization of some of the potassium chloride in the brine tank. Wicking, mushing, and recrystallization all decrease the effectiveness of the salt and negatively impact regeneration of the ion exchange material.

There is a need for improved salt products that avoid problems of prior art salt products.

SUMMARY OF THE INVENTION

The present invention is broadly concerned a method of treating water. The method comprises contacting an ion exchange material with an aqueous solution comprising a blend of sodium chloride and potassium chloride to yield a regenerated ion exchange material. The method further comprises contacting the regenerated ion exchange material with water so as to yield softened water, wherein said softened water comprises sodium and potassium ions.

The invention also involves a water softening blend comprising sodium chloride and potassium chloride. The blend is in the form of pieces having a maximum surface-to-surface dimension of less than about 4 inches and a minimum surface-to-surface dimension of at least about 0.25 inches.

The invention also includes a water softening composition comprising sodium chloride, potassium chloride, and an additive selected from the group consisting of binders, chelating agents, and mixtures thereof.

DETAILED DESCRIPTION OF THE INVENTION

The present invention is concerned with a salt composition comprising a blend of both potassium chloride and sodium chloride that offers unexpected benefits beyond the use of either component individually. The blended composition preferably comprises from about 25% to about 75% by weight sodium chloride, more preferably from about 35% to about 65% by weight sodium chloride, and even more preferably from about 45% to about 60% by weight sodium chloride, based upon the total weight of the blend taken as 100% by weight. The composition also preferably comprises from about 25% to about 75% by weight potassium chloride, more preferably from about 35% to about 65% by weight potassium chloride, and even more preferably from about 40% to about 50% by weight potassium chloride, based upon the total weight of the blend taken as 100% by weight. The weight ratio of sodium chloride to potassium chloride in the blend is preferably from about 10:90 to about 90:10, preferably from about 30:70 to about 70:30, more preferably from about 40:60 to about 60:40, and even more preferably about 57:43. In one aspect, the composition consists essentially of sodium chloride and potassium chloride.

The composition can be prepared by physically mixing the potassium chloride and sodium chloride in the desired amounts to create a substantially homogenous blend of the two, where each component is uniformly intermixed. That is, the potassium chloride and sodium chloride can be individually provided as discrete pieces of sodium chloride or potassium chloride (i.e., in particulate form, such as salt pellets, cubes, granules, or crystals), which can then be physically or mechanically mixed together, bagged, and sold. These pieces preferably have a maximum surface-to-surface dimension of less than about 4 inches, more preferably from about 0.25 inches to about 2.5 inches, and even more preferably from about 0.5 inches to about 1.5 inches. It is also preferred that the pieces have a minimum surface-to-surface dimension of at least about 0.25 inches, more preferably from about 0.25 inches to about 2.5 inches, and even more preferably from about 0.5 to about 1.5 inches. It will be appreciated that the maximum and minimum dimensions can be the same or different.

The composition can also be provided in the form of a self-sustaining body comprising the potassium chloride and sodium chloride compacted together into a single salt product. The compacted product can then be provided in the form of pellets, cubes, granules, pieces, or crystals, where each pellet, cube, etc. comprises a compacted admixture of the sodium chloride and potassium chloride. Suitable methods of compacting are known in the art (see e.g., U.S. Patent App. Pub. No. 2009/0127502, incorporated by reference herein in its entirety). The potassium chloride and sodium chloride are preferably substantially uniformly dispersed or intermixed in the compacted salt product. As was the case with the homogeneous blend discussed above, the compacted pieces preferably have a maximum surface-to-surface dimension of less than about 4 inches, more preferably from about 0.25 inches to about 2.5 inches, and even more preferably from about 0.5 inches to about 1.5 inches. It is also preferred that the pieces have a minimum surface-to-surface dimension of at least about 0.25 inches, more preferably from about 0.25 inches to about 2.5 inches, and even more preferably from about 0.5 to about 1.5 inches. Again, the maximum and minimum dimensions can be the same or different. Alternatively, the blended composition can be compacted into a single larger block for use in the brine tank.

A number of additional optional ingredients can also be included in the composition, such as binders, chelating agents, cleaning agents, and mixtures thereof. For example, the composition can further comprise a binder selected from the group consisting of sorbitol, alkali metal phosphates, and mixtures thereof. A particularly preferred binder comprises an aqueous mixture of sorbitol and an alkali metal phosphate, as described in U.S. Patent App. Pub. No. 2009/0127502. Examples of suitable alkali metal phosphates include those selected from the group consisting of sodium phosphates, disodium phosphates, sodium polyphosphates, potassium phosphates, potassium polyphosphates, and mixtures thereof. A particularly preferred alkali metal phosphate is sodium hexametaphosphate.

The binder can be provided in the composition as a part of one (i.e., the potassium chloride or sodium chloride individually) or both components in the blend or compacted product. Alternatively, the binder can be separately added to the blended components (i.e., after blending). When present, sorbitol can be included in the composition at a level of from about 50 ppm to about 1,000 ppm, preferably from about 250 ppm to about 750 ppm, and more preferably from about 450 ppm to about 550 ppm (based on the total blended composition). The alkali metal phosphate can be included in the composition at a level of from about 50 ppm to about 1,000 ppm, preferably from about 250 ppm to about 750 ppm, and more preferably from about 450 ppm to about 550 ppm (based upon the total blended composition).

The composition can also include chelating agents such as aliphatic acids. Suitable aliphatic acids include those selected from the group consisting of citric acid, acetic acid, ascorbic acid, salicylic acid, and mixtures thereof. When present, aliphatic acid can be included in the composition at a level of from about 0.01% to about 1% by weight, preferably from about 0.03% to about 0.1% by weight, and more preferably from about 0.04% to about 0.06% by weight, based upon the total weight of the blended composition taken as 100% by weight.

The moisture content of the composition will preferably be from about 0.01% to about 0.3% by weight, preferably from about 0.03% to about 0.1% by weight, and more preferably from about 0.05% to about 0.07% by weight, based upon the total weight of the composition taken as 100% by weight.

The inventive composition preferably has increased hardness compared to water softening compositions comprising sodium chloride or potassium chloride alone. That is, it was unexpectedly found that the hardness of the individual sodium chloride and potassium chloride components in the inventive blend was increased after a blend of the two salts was allowed to soak in water under conditions similar to those encountered in a water conditioning system, when compared to sodium chloride or potassium chloride that had been allowed to soak in water alone under these same conditions. In particular, it is preferred that the hardness of the sodium chloride component in the composition be from about 10 psig to about 25 psig, and more preferably from about 13 psig to about 16 psig. It is also preferred that the hardness of the potassium chloride component in the composition be from about 10 psig to about 25 psig, and more preferably from about 16 psig to about 20 psig. The term "hardness" as used herein refers to the amount of pressure required to break a ¼-inch piece of sodium chloride or potassium chloride from the blended composition after the composition has been allowed to soak in water for at least 48 hours.

The blended composition of the present invention can be used in conventional water softeners according to the instructions for the particular water softener. Thus, the composition preferably comprises food grade salts (i.e., safe for human consumption in levels expected to be present in water treated with the composition). In use, the ion exchange material in the water softener becomes saturated with calcium and magnesium ions removed from the incoming water, and depleted of sodium and potassium ions. The present method of recharging the ion exchange material comprises contacting the ion exchange material with an aqueous solution comprising the inventive blend during the regeneration cycle of the water softening system. This replenishes the ion exchange material with sodium and potassium ions and removes the calcium, magnesium, or other ions previously removed from the incoming water. One preferred ion exchange material is styrene copolymerized with divinyl benzene. The amount of blended composition used to regenerate the ion exchange material in the water softener will depend upon the hardness level of the water to be treated and the design of the softener, but the quantity will typically be from about 25% to about 75% by weight blended composition and preferably from about 40% to about 60% by weight blended composition, based upon the total weight of the water taken as 100% by weight.

Next, water to be treated is contacted with the ion exchange material in the softener that has been regenerated or recharged with the blended composition so that the metal ions of the salts will replace the undesirable ions present in the water. Thus, the resulting softened water comprises sodium and potassium ions (in place of the calcium and magnesium ions found in the untreated water). Preferably and unexpectedly, the sodium chloride component of the blended composition will be used by the system at the same rate as the potassium chloride component. That is, the resulting softened water will contain the same ratios of sodium ions to potassium ions as the ratio contained in the starting blended composition in the brine tank. The weight ratio of sodium ions to potassium ions in the starting blended composition in the brine tank will also preferably remain constant throughout the life cycle of the blended salt product in the brine tank. The weight ratio of sodium ions to potassium ions will remain at a level of from about 10:90 to about 90:10, preferably from about 30:70 to about 70:30, more preferably from about 40:60 to about 60:40, and even more preferably about 50:50 during the life cycle of the blended salt product. The softened water will preferably contain from about 20 to about 100 mg sodium ions per liter of water, more preferably from about 50 to about 70 mg sodium ions per liter of water, and even more preferably from about 40 to about 60 mg sodium ions per liter of water, based upon 10 grain hard water. The softened water will also preferably contain from about 20 ppm to about 100 ppm potassium ions, more preferably from about 30 ppm to about 70 ppm potassium ions, and even more preferably from about 40 ppm to about 60 ppm potassium ions.

The inventive blended composition has a number of significant advantages over prior art salt products. For example, the blended composition overcomes the problems of wicking, mushing, and recrystallization. The individual components of the blended composition in the brine tank also have increased hardness compared to each individual component alone in the brine tank. Another surprising result is that both salts are used by the system at the same rate, despite the solubilities differences between sodium chloride and potassium chloride. This was not expected, since sodium chloride dissolves into solution before potassium chloride. In view of these unexpected results, a superior water conditioning product can be based on this combination that provides the benefits of potassium chloride-based softeners without the significant increase in expense associate with a potassium only product.

EXAMPLES

The following examples set forth preferred methods in accordance with the invention. It is to be understood, however, that these examples are provided by way of illustration and nothing therein should be taken as a limitation upon the overall scope of the invention.

Example 1

Analysis of Water Softened with NaCl/KCl Salt Blend

Figure 1:
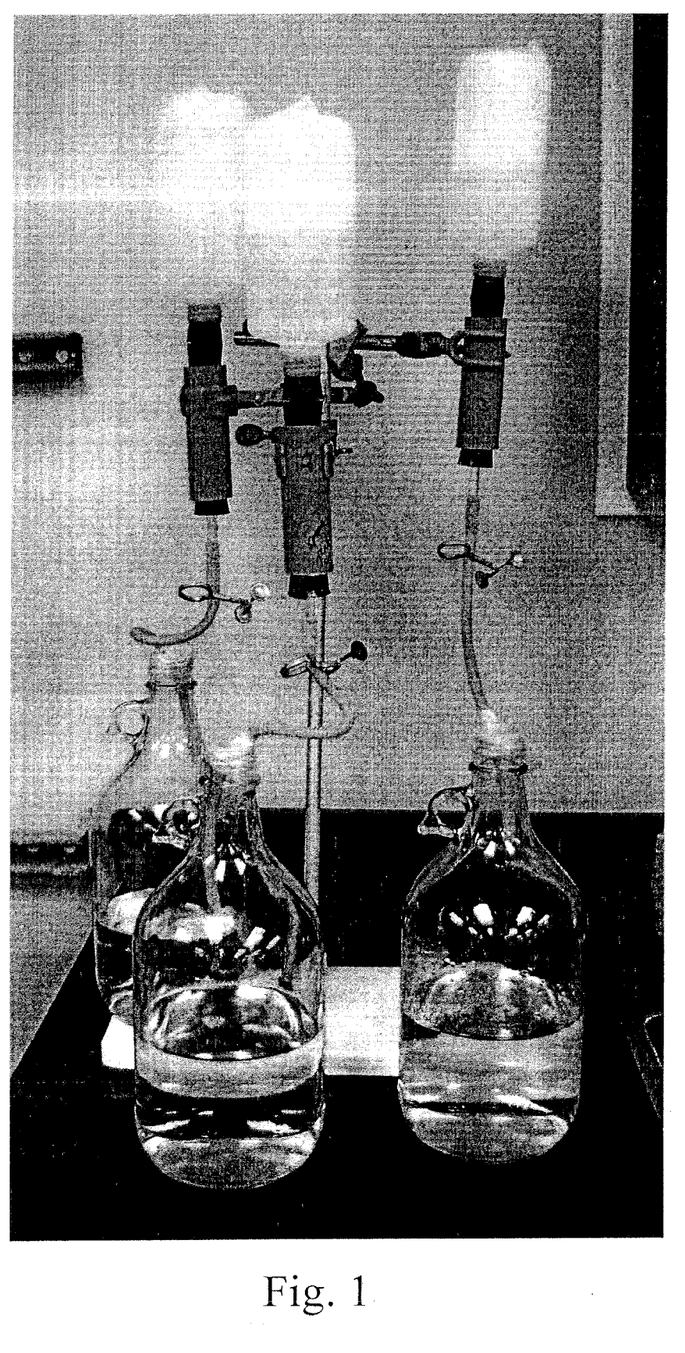
FIG. 1 is a photograph of the apparatus design to simulate conditions of a water softening system to test the effectiveness of the blended composition in Example 1.

An apparatus was set up in triplicate to simulate a water conditioning system as shown in FIG. 1. A section of 1-inch PVC pipe was filled with 5 grams of polystyrene resin and capped at both ends with one-hole rubber stoppers. A glass tube was inserted into one end of the stoppered PVC pipe, and the other end of the glass tube was coupled to silastic tubing. The PVC pipe was secured about 12 inches above a work table using a clamp, and the free end of the silastic tubing was extended downward and placed into a large glass jar. A plastic bottle was used as the reservoir for the brine and water solutions to be passed through the resin, as discussed below. During each run, the plastic bottle was filled with the designated solution and capped with a one-hole rubber stopper. The stoppered bottle was then inverted and coupled to the other end of the stoppered PVC pipe using a glass tube. The solution was run through the resin in the PVC pipe, and the silastic tubing was fitted with a small clamp to adjust the flow.

Before testing, a stock solution of NaCl/KCl in accordance with the invention was prepared by mixing 300 grams of NaCl (Sure Soft mini cube; ground to 30 mesh; North American Salt Company, Overland Park, Kans.) and 225 grams of KCl (K-Life® ground to 30 mesh; North American Salt) in 1,000 ml of tap water. The mixture was hand swirled intermittently for a period of 2 minutes and then allowed to rest overnight to reach a saturated solution. Prior to use, the solution was re-swirled.

The resin was first charged with a NaCl brine. The NaCl brine was made by preparing a 125-ml fully saturated aqueous NaCl solution that was then diluted with another 125 ml of tap water (24 grains hardness) to produce a 250-ml NaCl brine that was run through the resin as described above. Next, 100 ml of ultrapure water (18.2 mega-ohm) was run through the resin, followed by 2 liters of tap water and another 100 ml of ultrapure water. The collected water was then discarded.

Next, 125 ml of the NaCl/KCl brine was removed from the stock solution prepared above, and added to 125 ml of tap water. The resulting 250-ml solution was then run through the resin bed, followed by 100 ml of ultrapure water and 2 liters of tap water. The collected water was analyzed using inductively coupled plasma (ICP) (DV 2100, PerkinElmer) to determine the concentration of potassium and sodium ions in the "softened" water (run #1). The resin was then flushed using 100 ml of ultrapure water.

For the second run, 125 ml of NaCl/KCl was removed from the stock solution, mixed with 125 ml of tap water, and then run through the resin, followed by 100 ml of the ultrapure water and 2 liters of tap water. The collected "softened" water (run #2) was then analyzed as described above, and the resin was flushed using 100 ml of ultrapure water. This process was repeated until 8 runs of softened water had been collected. The results of the ICP are shown in FIG. 2.

The foregoing test and data was replicated by an independent laboratory (SDK Laboratory; Hutchinson, Kans.), and analyzed using an Ultima 2 ICP made by HORIBA Jobin Yvon (Edison, N.J.). These results are shown in FIG. 3.

Figure 2:
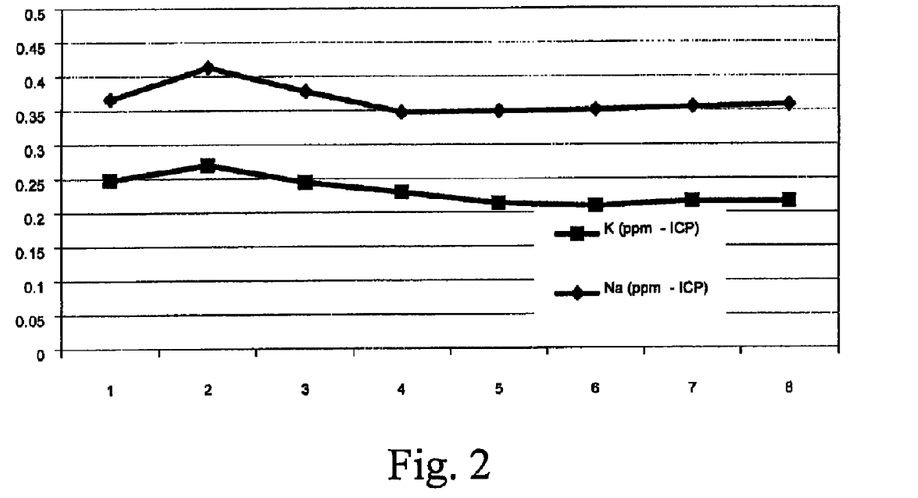
FIG. 2 is a graph depicting the results of the analysis of the softened water collected in Example 1.
Figure 3:
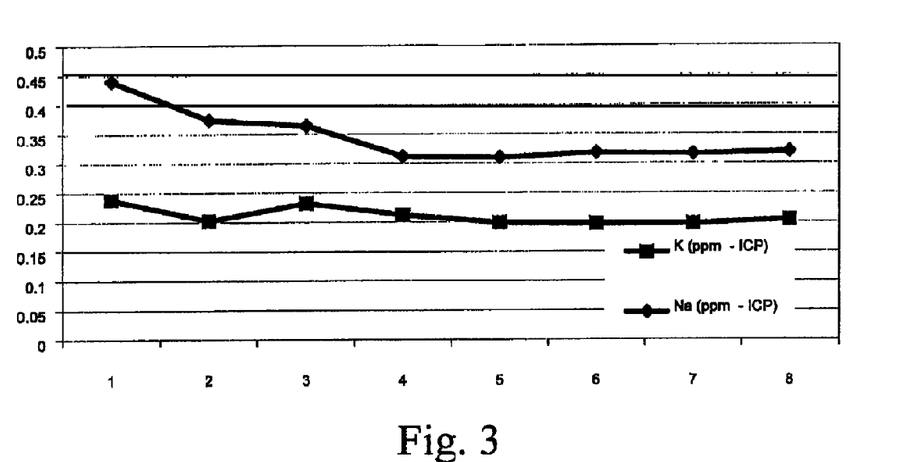
FIG. 3 is a graph depicting the results of the analysis of the softened water collected by the independent laboratory in Example 1.
Figure 4:
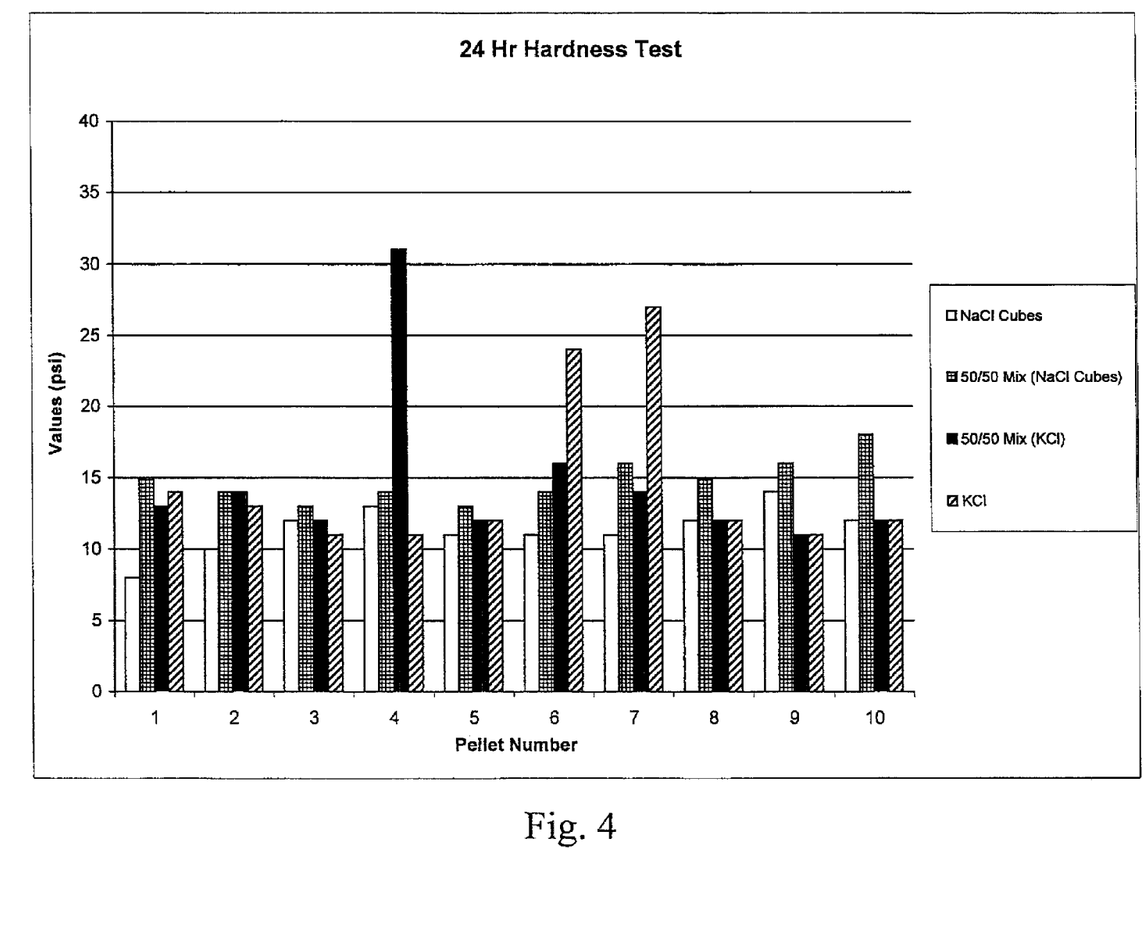
FIG. 4 is a graph of the hardness test results from the salt soaked for 24 hours in Example 2.
Figure 5:
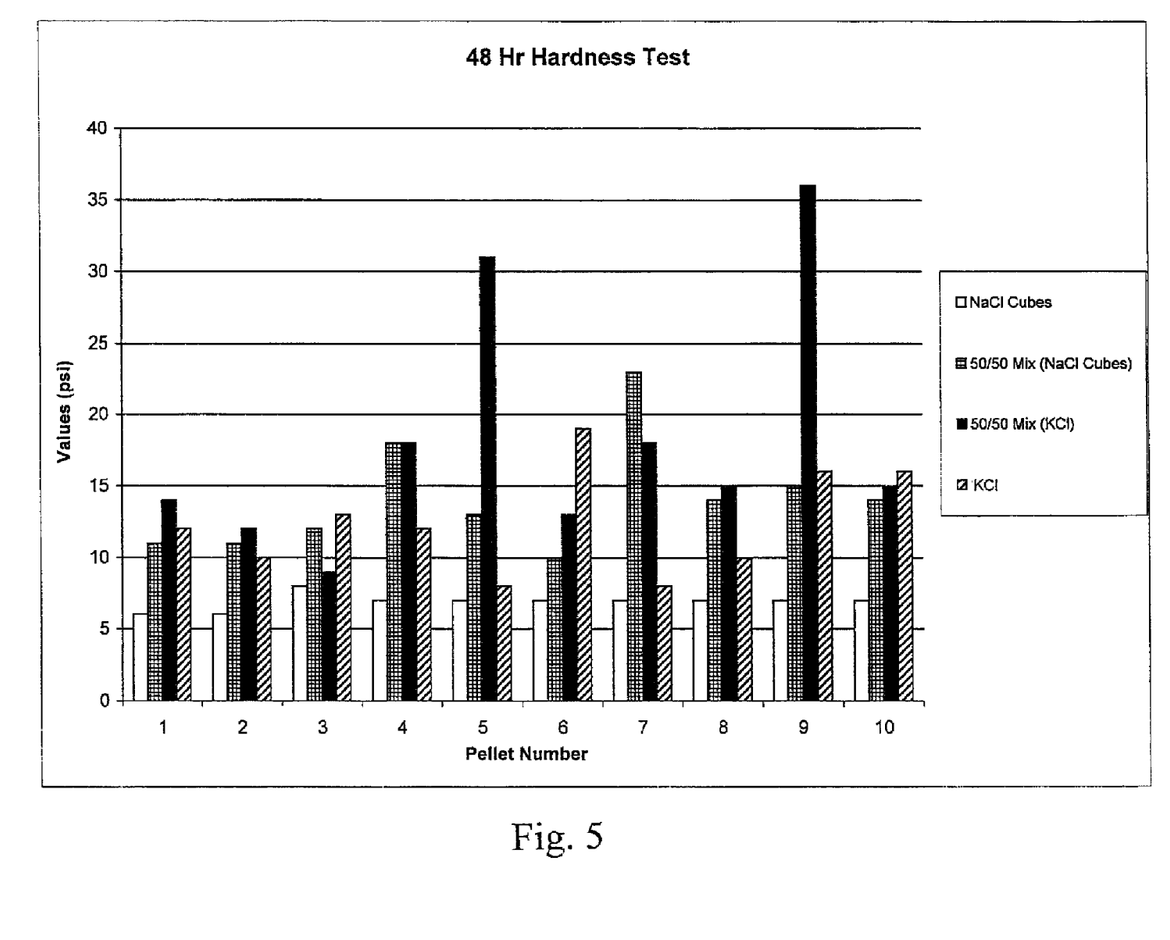
FIG. 5 is a graph of the hardness test results from the salt soaked for 48 hours in Example 2.
Figure 6:
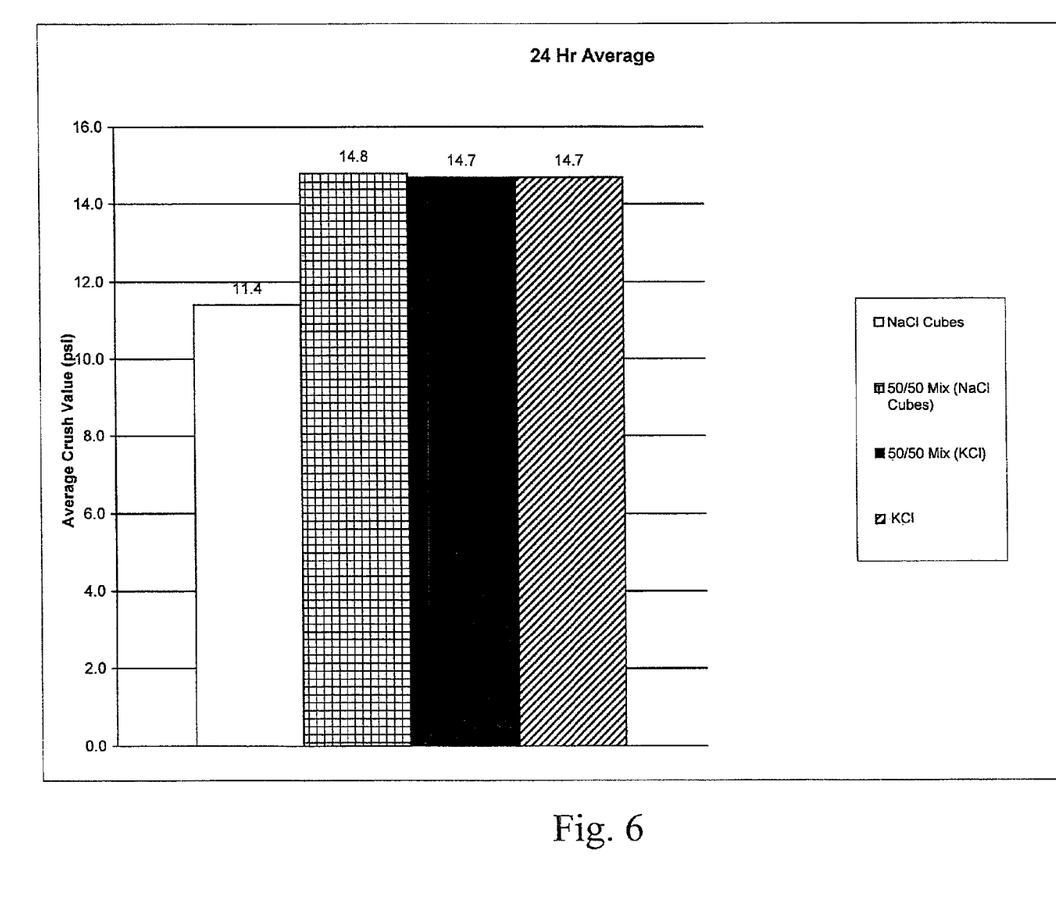
FIG. 6 is a graph of the average hardness test from the 24-hour test in Example 2.
Figure 7:
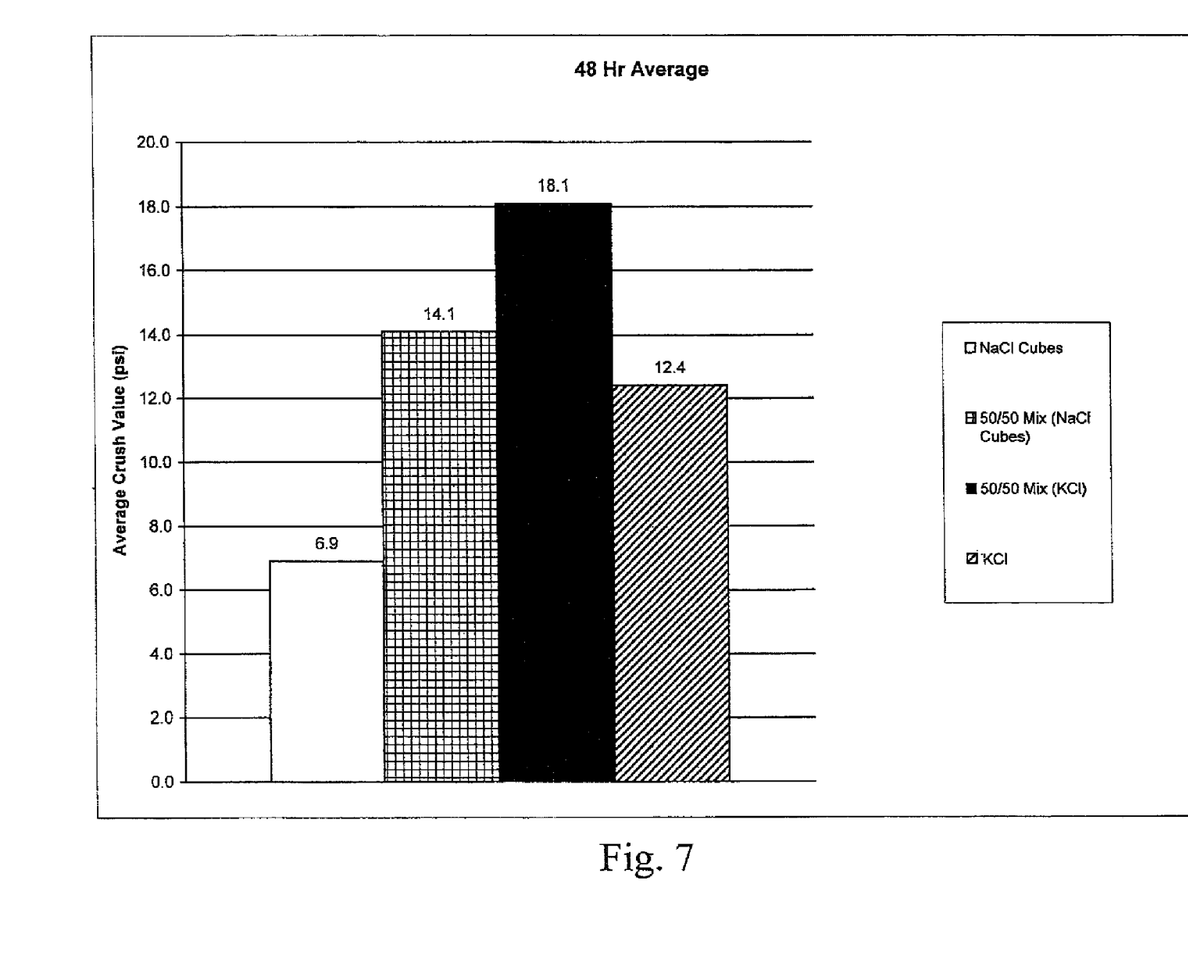
FIG. 7 is a graph of the average hardness test results from the 48-hour test in Example 2.

As can be seen from FIGS. 2-3, the results demonstrate a surprisingly constant ratio of "use" of both salts by the system in conditioning the water despite the different solubilities of NaCl and KCl.

Example 2

Crush Testing of NaCl/KCl Salt Product

In this Example, the hardness of the blended NaCl/KCl composition was compared to the hardness of each component individually. NaCl cubes (mini-cubes), KCl pellets (K-Life®), and a 57:43 weight ratio blend of NaCl/KCl were each separately soaked in water for a period of 24 or 48 hours. The soaked salt was then screened to discard any pieces smaller than ¼ inch. The pieces were individually placed on a crushing apparatus that applied a measurable pressure to each piece. For the NaCl/KCl blend, the NaCl and KCl were separated and crushed individually after being soaked together in the blended composition. The results from this testing are set forth in Table 1 and shown in FIGS. 4-7. The "break values" set forth in the table indicate the strength of the pieces by giving the pressure (in psig) at which the pieces broke. In particular, the average break value at 24 hours is indicative of initial strength (the higher the number, the stronger the tablet). As can be seen from the results, the average obtained when using the inventive blend is improved over the control products. For example, the average strength of the NaCl cubes from the blended composition soaked for 48 hours was over 2 times stronger than the NaCl cubes alone. Likewise, the average strength of the KCl pellets from the blended composition soaked for 48 hours was almost 1½ times stronger than the KCl pellets alone. Thus, the NaCl and KCl of the blended inventive product will preferably have a strength that is at least 1.5 times, more preferably at least about 1.75 times, and even more preferably at least about 2 times that of the individual NaCl and KCl strengths before blended product formation.

TABLE 1

|  |  | NaCl |  | Mix NaCl |  | KCl |  | KCl |  |
|---|---|---|---|---|---|---|---|---|---|
| SAMPLE | | 24 hrs | 48 hrs | 24 hrs | 48 hrs | 24 hrs | 48 hrs | 24 hrs | 48 hrs |
| Break | 1 | 8 | 6 | 15 | 11 | 13 | 14 | 14 | 12 |
| Value | 2 | 10 | 6 | 14 | 11 | 14 | 12 | 13 | 10 |
| (psig) | 3 | 12 | 8 | 13 | 12 | 12 | 9 | 11 | 13 |
|  | 4 | 13 | 7 | 14 | 18 | 31 | 18 | 11 | 12 |
|  | 5 | 11 | 7 | 13 | 13 | 12 | 31 | 12 | 8 |
|  | 6 | 11 | 7 | 14 | 10 | 16 | 13 | 24 | 19 |
|  | 7 | 11 | 7 | 16 | 23 | 14 | 18 | 27 | 8 |
|  | 8 | 12 | 7 | 15 | 14 | 12 | 15 | 12 | 10 |
|  | 9 | 14 | 7 | 16 | 15 | 11 | 36 | 11 | 16 |
|  | 10 | 12 | 7 | 18 | 14 | 12 | 15 | 12 | 16 |
|  | Standard deviation | 1.65 | 0.57 | 1.55 | 3.90 | 5.91 | 8.62 | 5.81 | 3.66 |
|  | Average | 11.4 | 6.9 | 14.8 | 14.1 | 14.7 | 18.1 | 14.7 | 12.4 |
|  | % RSD[1] | 14.44 | 8.23 | 10.47 | 27.66 | 40.19 | 47.63 | 39.54 | 29.50 |

[1]Relative standard deviation.

Example 3

Durability Testing

In this Example, a 50:50 by weight mixture of NaCl (SureSoft mini cubes) and KCl (K-Life®) was placed in a 5-gallon bucket along with 2 liters of tap water. Buckets were also prepared using NaCl only and KCl only. Two buckets were prepared for each sample. A disc was placed on top of the salt in each bucket along with a 50-lb. weight. The buckets were then covered and allowed to sit undisturbed at ambient temperature (68-70° F.) to simulate the conditions of a water conditioning system. The buckets were then checked at 2 weeks, 4 weeks, and 6 weeks.

At 6 weeks, the buckets containing KCl were observed to have undergone recrystallization, while the buckets containing NaCl had formed a solid mass with very little remaining water in the bottom of the bucket. The buckets containing the 50:50 mixture had no mushing, wicking, or recrystallization.

The above procedures were then repeated using new samples. After 6 weeks, the remaining water left in the bottom of each bucket (from the starting 2 liters) was poured off and measured. The buckets containing the NaCl alone resulted in only about 200 ml of water due to wicking of the liquid into the salt, while the buckets containing the KCl and 50:50 blend of NaCl and KCl each had bout 1,800 ml of water left in the bucket. Thus, the 50:50 blend unexpectedly not only stopped the recrystallization observed with KCl alone, but also prevented the wicking observed with NaCl alone.

We claim:

1. A method of treating water, comprising contacting an ion exchange material with an aqueous solution comprising a binder and a blend of sodium chloride and potassium chloride to yield a regenerated ion exchange material; wherein:

the weight ratio of sodium chloride to potassium chloride in said blend is from about 10:90 to about 90:10;

said blend comprises from about 25% to about 75% by weight sodium chloride and from about 25% to about 75% by weight potassium chloride, based upon the total weight of the blend taken as 100% by weight; and said binder is selected from the group comprising sorbitol, alkali metal phosphates, and mixtures thereof.

2. The method of claim 1, said aqueous solution comprising from about 25% to about 75% by weight of said blend, based upon the total weight of the solution taken as 100% by weight.

3. The method of claim 1, wherein said blend further comprises a chelating agent.

4. The method of claim 1, further comprising contacting said regenerated ion exchange material with hard water so as to yield softened water.

5. The method of claim 4, wherein said softened water comprises sodium and potassium ions.

6. The method of claim 5, wherein said sodium and potassium ions are present at a ratio of from about 10:90 to about 90:10.

7. The method of claim 1, wherein said sodium chloride has a hardness of from about 10 psig to about 25 psig.

8. The method of claim 1, wherein said potassium chloride has a hardness of from about 10 psig to about 25 psig.

9. A water softening blend comprising sodium chloride and potassium chloride and a binder, said blend being in the form of pieces having a maximum surface-to-surface dimension of less than about 4 inches and a minimum surface-to-surface dimension of at least about 0.25 inches; wherein:

the weight ratio of sodium chloride to potassium chloride in said blend is from about 10:90 to about 90:10;

said blend comprises from about 25% to about 75% by weight sodium chloride and from about 25% to about 75% by weight potassium chloride, based upon the total weight of the blend taken as 100% by weight; and said binder is selected from the group comprising sorbitol, alkali metal phosphates, and mixtures thereof.

10. The blend of claim 9, wherein said blend comprises discrete pieces of sodium chloride and discrete pieces of potassium chloride.

11. The blend of claim 9, wherein said pieces comprise sodium chloride compacted with potassium chloride.

12. The blend of claim 9, said blend further comprising a chelating agent.

13. The blend of claim 12, wherein said chelating agent is an aliphatic acid.

14. The blend of claim 9, wherein said blend has a moisture content of from about 0.01% to about 0.3% by weight, based upon the total weight of the blend taken as 100% by weight.

\* \* \* \* \*